(12) United States Patent
Elson (10) Patent No.: US 9,347,443 B2
(45) Date of Patent: May 24, 2016

(54) DISCHARGE VALVE FOR RECIPROCATING COMPRESSOR HAVING INNER AND OUTER FLOW AREAS

(71) Applicant: Emerson Climate Technologies, Inc., Sidney, OH (US)

(72) Inventor: John P. Elson, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 353 days.

(21) Appl. No.: 13/929,131

(22) Filed: Jun. 27, 2013

(65) Prior Publication Data

US 2014/0003986 A1 Jan. 2, 2014

Related U.S. Application Data

(60) Provisional application No. 61/667,125, filed on Jul. 2, 2012.

(51) Int. Cl.
*F04B 39/10* (2006.01)
*F16K 15/14* (2006.01)

(52) U.S. Cl.
CPC ........... *F04B 39/108* (2013.01); *F04B 39/1033* (2013.01); *F04B 39/1086* (2013.01); *F16K 15/148* (2013.01)

(58) Field of Classification Search
CPC .............. F04B 39/1073; F04B 39/108; F04B 39/1086; F04B 39/102; F04B 39/1033; F04B 53/1025; F04B 53/103; F04B 53/1032; F04B 53/1075; F04B 53/1085; F16K 15/142; F16K 15/148
See application file for complete search history.

(56) References Cited

U.S. PATENT DOCUMENTS

| 1,273,366 A | * | 7/1918 | Heideman | ........... F04B 39/1033 |
| | | | | 137/512 |
| 3,805,827 A | * | 4/1974 | Kennedy | ............. F04B 39/1073 |
| | | | | 137/516.17 |
| 3,994,319 A | | 11/1976 | Airhart | |

(Continued)

FOREIGN PATENT DOCUMENTS

| CN | 1132825 A | 10/1996 |
| CN | 1295433 C | 1/2007 |

(Continued)

OTHER PUBLICATIONS

Notification of Making Rectification regarding Chinese Application No. 201320389132.9, issued Nov. 19, 2013. English translation provided by Unitalen Attorneys at Law.

(Continued)

*Primary Examiner* — Bryan Lettman
*Assistant Examiner* — Timothy P Solak
(74) *Attorney, Agent, or Firm* — Harness, Dickey & Pierce, P.L.C.

(57) ABSTRACT

A compressor may include a compressor body and a discharge valve assembly coupled to the compressor body. The discharge valve assembly directs discharge gas from the compressor body and between a valve plate and a valve retainer. The discharge valve assembly may include at least one reed valve assembly including a first support guide member, a second support guide member, and a reed assembly. The reed assembly may include a reed and a spring washer disposed between the first and the second support guide members.

20 Claims, 9 Drawing Sheets

(56) References Cited

U.S. PATENT DOCUMENTS

| | | | | |
|---|---|---|---|---|
| 4,100,934 A | * | 7/1978 | Butterworth | F04B 39/1073 137/454.4 |
| 4,685,489 A | | 8/1987 | Yun et al. | |
| 4,811,757 A | * | 3/1989 | Brandt | F04B 39/1033 137/514.5 |
| 4,820,137 A | * | 4/1989 | MacLeod | F04B 47/02 137/533.27 |
| 5,678,985 A | | 10/1997 | Brooke et al. | |
| 7,214,040 B2 | | 5/2007 | Froeslev et al. | |
| 2004/0164268 A1 | * | 8/2004 | Obara | F04B 39/1073 251/368 |
| 2014/0003986 A1 | | 1/2014 | Elson | |

FOREIGN PATENT DOCUMENTS

| | | |
|---|---|---|
| CN | 203640966 U | 6/2014 |
| JP | 2009275650 A | 11/2009 |

OTHER PUBLICATIONS

Office Action regarding Chinese Patent Application No. 201310274722.1, dated Jun. 30, 2015. Translation provided by Unitalen Attorneys at Law.

* cited by examiner

DISCHARGE VALVE FOR RECIPROCATING COMPRESSOR HAVING INNER AND OUTER FLOW AREAS

CROSS-REFERENCE TO RELATED APPLICATION

This application claims the benefit of U.S. Provisional Application No. 61/667,125, filed on Jul. 2, 2012. The entire disclosure of the above application is incorporated herein by reference.

FIELD

The present disclosure relates generally to reciprocating compressors, and more particularly to a discharge valve assembly configured on a reciprocating compressor.

BACKGROUND

The statements in this section merely provide background information related to the present disclosure and may not constitute prior art.

In general, reciprocating compressors can include a compressor body and a drive motor arranged in the compressor body. The drive motor can drive a piston disposed within a compression cylinder formed in the compressor body. Some arrangements include multiple pistons that reciprocate in dedicated cylinders formed in the compressor body. The electric motor may include a stator, a rotor, and a crankshaft that is configured to drive the piston or pistons. Typically, the compression cylinder can include a cylinder block defining a compression chamber in which the pistons are reciprocally movable in a linear direction by respective connecting rods disposed between the pistons and the respective portions of the crankshaft. Typically, a valve assembly is mounted to the compressor body and includes valving therein for providing controlled discharge of compressed gases from the compression chamber. In some configurations however, such valve assemblies may not provide the desired flow capacity needed for certain applications.

SUMMARY

This section provides a general summary of the disclosure, and is not a comprehensive disclosure of its full scope or all of its features.

A compressor constructed in accordance to one example of the present disclosure can include a compressor body and a discharge valve assembly coupled to the compressor body. The discharge valve assembly can be configured to direct discharge gas from the compressor body and between a valve plate and a valve retainer. The discharge valve assembly may comprise at least one reed valve assembly comprising a first support guide member, a second support guide member, and a reed assembly. The reed assembly can include a reed and a spring washer disposed between the first and the second support guide members.

The reed assembly may be movable between a closed position wherein the reed engages the valve plate to restrict discharge gas from exiting the compressor body and an open position wherein the reed is displaced from the valve plate and permits gas to escape the compressor body through an escape area. The escape area may be defined collectively by an outer escape area between an outer diameter of the reed and the valve plate and an inner escape area defined between an inner diameter of the reed and the second support guide.

According to additional features, the escape area can be further defined by an upper channel area that is defined between the reed assembly and the first support guide member. The escape area can be further defined by an inner channel area that is defined between the reed assembly and the second support guide.

According to still other features, the reed assembly can further comprise an upper washer that engages the first support guide in the open position. The first support guide member can include a first central hub and at least three first arms that extend therefrom. The at least three first arms of the first support guide member can extend a distance greater than an inner diameter of the upper washer and provide an upper support for the reed assembly.

According to other features, the second support guide member can include a second central hub and at least three second arms that extend therefrom. The at least three second arms can extend a distance less than the inner diameter of the reed. The first and second support guide members can be separately formed and coupled together. The valve plate can comprise a conical flow boundary surface. The reed assembly can further comprise a plurality of spring washers. A bolt can centrally extend through the reed valve assembly and threadably mate with the second support guide member.

According to additional features, the at least three first arms can be radially aligned with the at least three second arms. The at least three first arms can extend radially outwardly a first distance. The at least three second arms can extend radially outwardly a second distance. The first distance can be greater than the second distance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
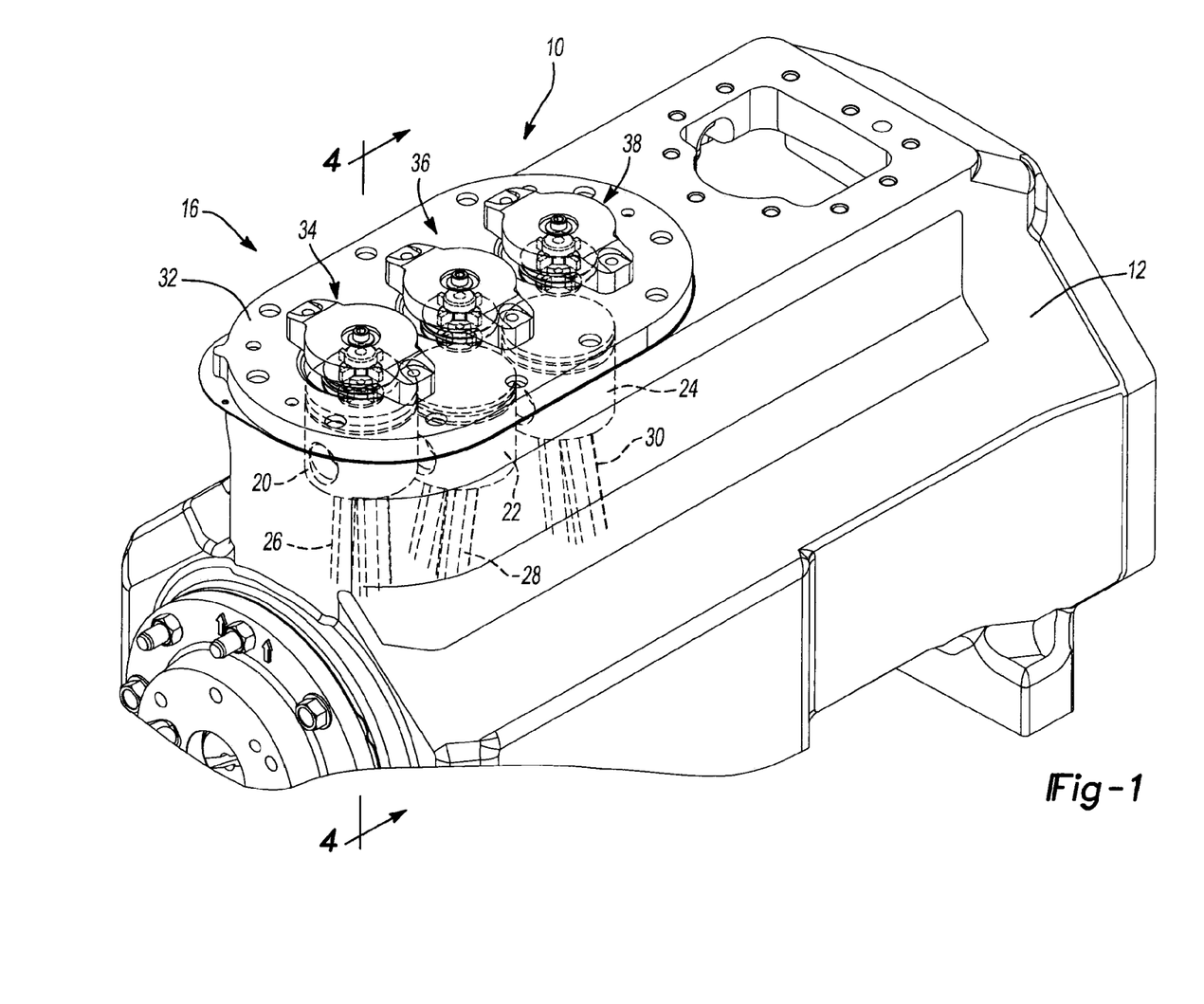
FIG. 1 is a perspective view of a rotary compressor according to one example of the present disclosure.
Figure 2:
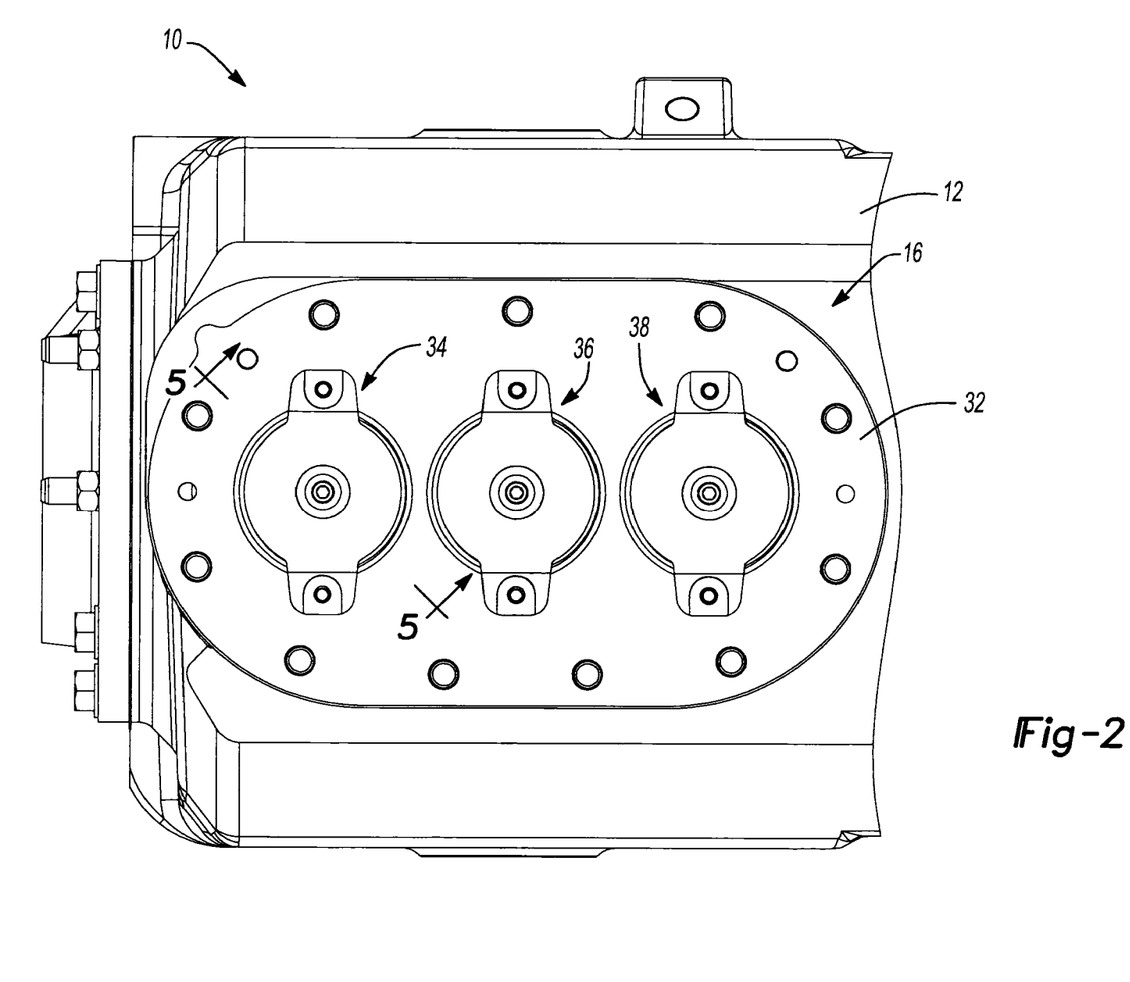
FIG. 2 is a plan view of the rotary compressor of FIG. 1.
Figure 3:
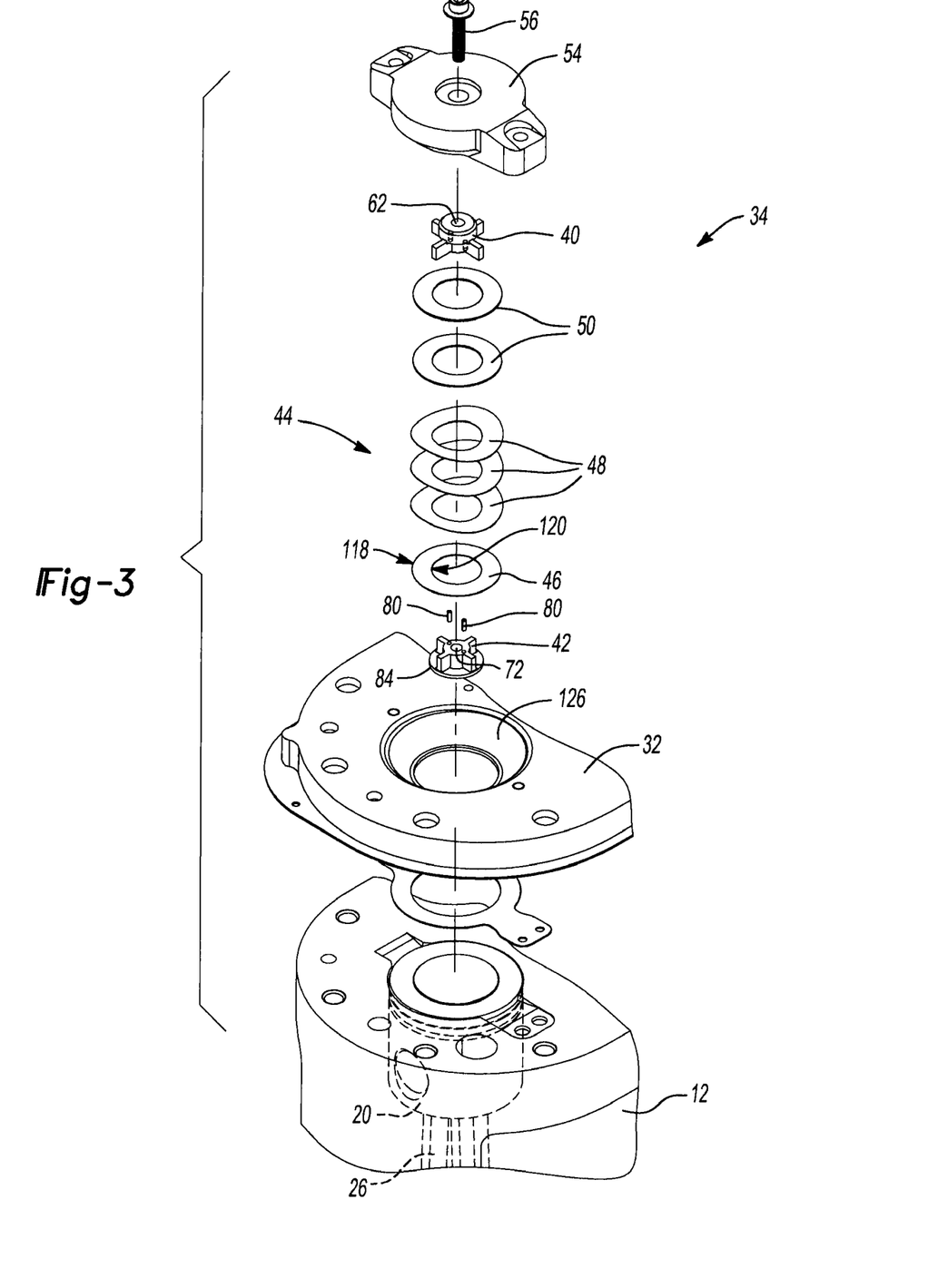
FIG. 3 is a partial exploded view of a reed valve assembly of a discharge valve assembly configured on the compressor of FIG. 1.
Figure 4:
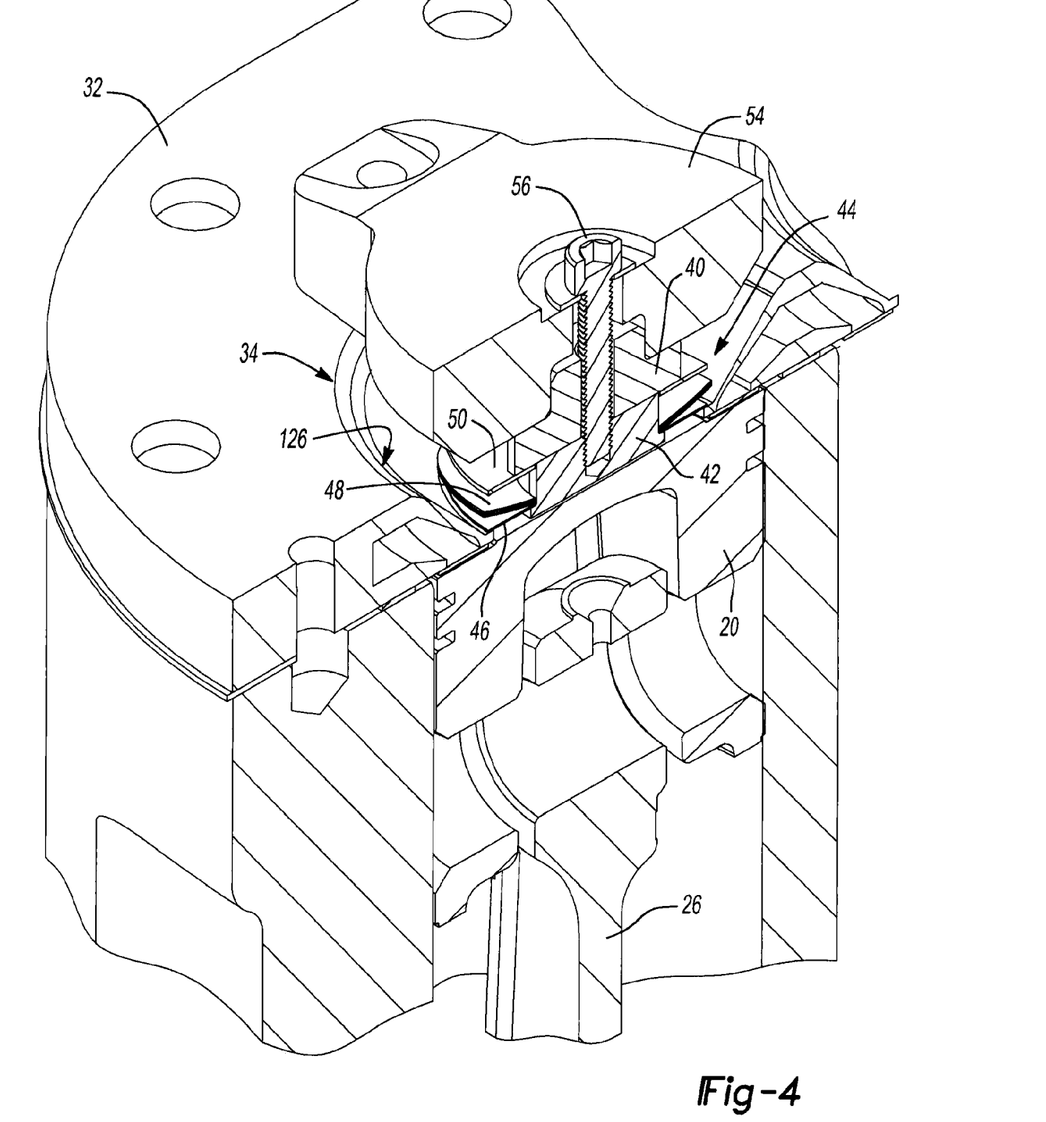
FIG. 4 is a partial cross-sectional view of the compressor taken along lines 4-4 of FIG. 1.

With initial reference to FIGS. 1 and 2, a compressor assembly 10 is shown and may generally be a reciprocating piston-type compressor. The compressor assembly 10 may include a compressor body 12 incorporating a discharge valve assembly 16 thereon. The compressor body 12 according to the example shown includes first, second, and third pistons 20, 22, and 24 that are reciprocally movable in linear directions by respective connecting rods 26, 28, and 30. The connecting rods 26, 28 and 30 are disposed between the respective pistons 20, 22, and 24 and a crankshaft (not specifically shown). The discharge valve assembly 16 can generally comprise a valve plate 32 that cooperates with a first reed valve assembly 34, a second reed valve assembly 36, and a third reed valve assembly 38. It will be appreciated that the first reed valve assembly 34 may be associated with the first piston 20. Similarly, the second reed valve assembly 36 may be associated with the second piston 22. The third reed valve assembly 38 may be associated with the third piston 24. As will become appreciated from the following discussion, the particular configuration of the reed valve assemblies 34, 36, and 38 of the discharge valve assembly 16 can provide an improved discharge flow area from respective compression chambers through which the pistons reciprocate. It will be appreciated however that while the discharge valve assembly 16 has been shown as part of a three piston compressor, it is not so limited. In this regard, the discharge valve assembly 16 may be adapted for use with compressor assemblies having one or more pistons.

With additional reference now to FIGS. 3-6, additional features of the discharge valve assembly 16 will be described. For discussion purposes, the reed valve assembly 34 of the discharge valve assembly 16 will be described in greater detail with the understanding that the second and third reed valve assemblies 36 and 38 may be constructed similarly. The reed valve assembly 34 can generally comprise a first or upper support guide member 40, a second or lower support guide member 42, and a reed assembly 44. The upper and lower support guide members 40 and 42 are separately formed and subsequently coupled together by pins 80. In other examples, the upper and lower support guides 40 and 42 may comprise multiple components.

The reed assembly 44 can include a reed 46, a plurality of spring washers 48, and a pair of upper washers 50. The reed valve assembly 34 can be disposed between the valve plate 32 and a valve retainer 54. While the reed assembly 44 is shown with three spring washers 48, it will be appreciated that the reed assembly 44 may incorporate other quantities of spring washers and/or other biasing members. Likewise, while a pair of upper washers 50 are shown, the reed assembly 44 may incorporate other quantities and/or structures for engaging the upper support guide member 40. In addition, while the upper support guide member 40 and the valve retainer 54 are shown as separate components, it will be appreciated that the support guide member 40 and the valve retainer 54 may be integrally formed as a single unit or component. A bolt 56 can generally secure the reed valve assembly 34 in a concentric manner.

Figure 10:
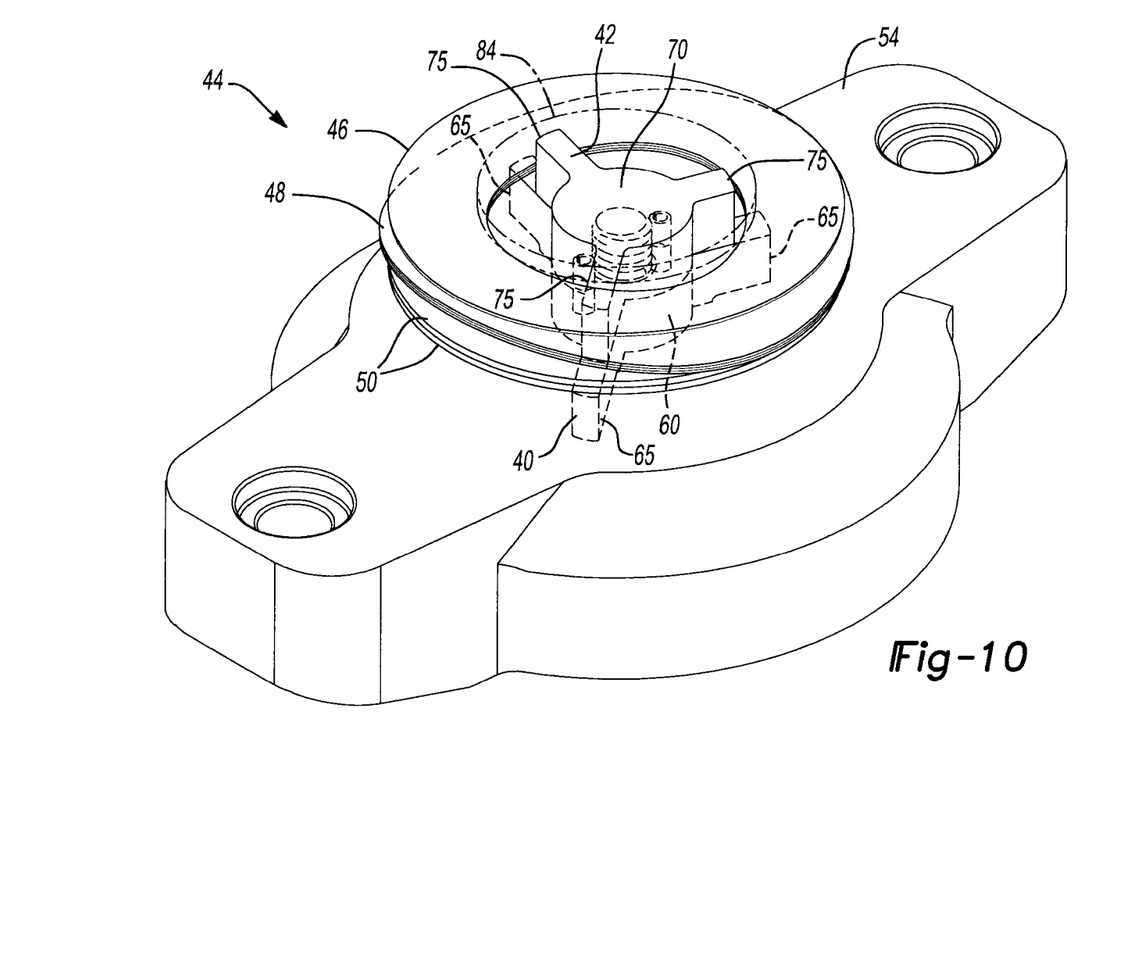
FIG. 10 is a perspective view of the valve retainer, upper support washers, spring washers, reed, an alternative configuration of the upper support guide member, and an alternative configuration of the lower support guide member of the reed valve assembly shown in FIG. 3.

With general reference now to FIGS. 3-5 and 8, the upper support guide member 40 will be described in greater detail. The upper support guide member 40 generally comprises an upper central hub 60 defining a throughbore 62 therein. Two pairs of arms 64 and 66 (FIG. 8), respectively, extend from the upper central hub 60. It will be appreciated that while the following description is directed generally toward "pairs" of arms 64, 66, the arms may be configured in one, two or other amounts of single arms 65 (FIG. 10) within the scope of the present disclosure. In the example shown in FIGS. 1-9, the pairs of arms 64 and 66 are arranged orthogonally relative to each other. The pairs of arms 64 and 66 may also be arranged asymmetrically (i.e., the pairs of arms 64 and 66 may be arranged at various and differing angles relative to each other). In the example shown in FIG. 10, the arms 65 are arranged at equal angles relative to the adjacent arms 65 (i.e., approximately 120 degrees when using three (3) arms 65). The arms 65 may also be arranged asymmetrically (i.e., the arms 65 may be arranged at various and differing angles relative to each other). While not shown, in a configuration that includes only two (2) arms 65, the arms 65 may also be arranged symmetrically (i.e., approximately 180 degrees apart) or asymmetrically (i.e., the arms 65 may be arranged at various and differing angles relative to each other).

Figure 8:
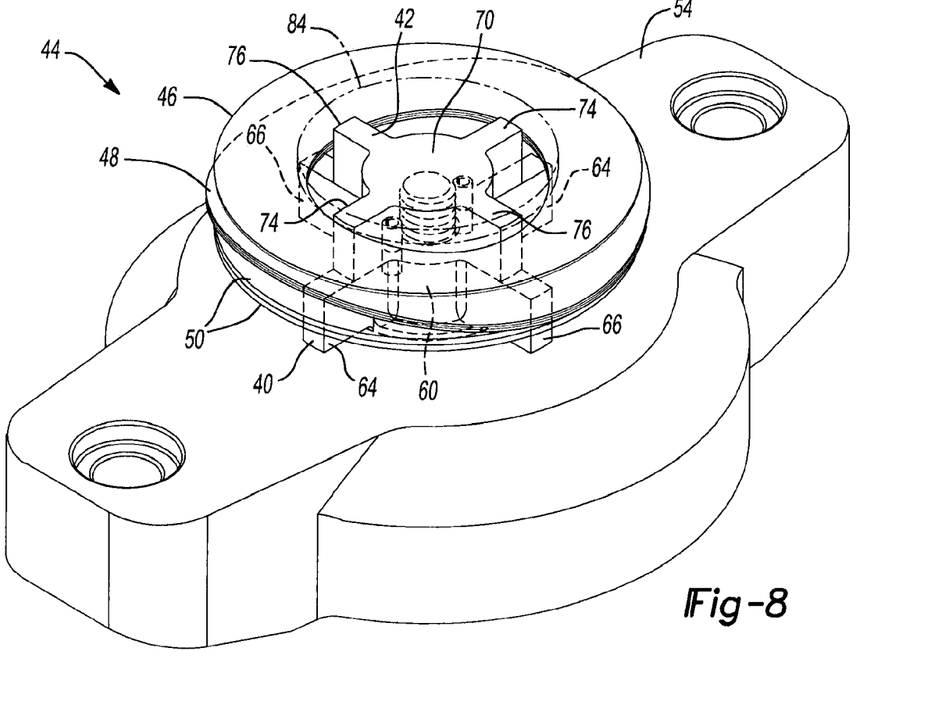
FIG. 8 is a perspective view of the valve retainer, upper support washers, spring washers, reed, upper support guide member, and lower support guide member of the reed valve assembly shown in FIG. 3.

The lower support guide member 42 generally includes a lower central hub 70 that defines a blind bore 72 (FIG. 5) therein. The blind bore 72 may be threaded for mating with the bolt 56. Two pairs of arms 74 and 76 extend from the lower central hub 70 (FIG. 8). It will be appreciated that while the following description is directed generally toward "pairs" of arms 74, 76, the arms may be configured in two, three or other amounts of single arms 75 (FIG. 10) within the scope of the present disclosure. In the example shown in FIGS. 1-9, the pairs of arms 74 and 76 are arranged orthogonally relative to each other. The pairs of arms 74 and 76 may also be arranged asymmetrically (i.e., the pairs of arms 74 and 76 may be arranged at various and differing angles relative to each other). In the example shown in FIG. 10, the arms 75 are arranged at equal angles relative to the adjacent arms 75 (i.e., approximately 120 degrees when using three (3) arms 75). The arms 75 may also be arranged asymmetrically (i.e., the arms 75 may be arranged at various and differing angles relative to each other). While not shown, in a configuration that includes only two (2) arms 75, the arms 75 may also be arranged symmetrically (i.e., approximately 180 degrees apart) or asymmetrically (i.e., the arms 75 may be arranged at various and differing angles relative to each other).

Notably, the arms 64 and 66 of the upper support guide member 40 extend a distance greater than an inner diameter of the upper washers 50 such that the pairs of arms 64 and 66 maintain the upper washers 50 a distance away from the valve retainer 54. Similarly, the lower support guide member 42 includes a lower flange 84 that extends a distance greater than an inner diameter of the reed 46 (see FIG. 5), while the arms 74 and 76 extend a distance less than the inner diameter of the reed 46 (see FIG. 4). In addition, the arms 64 and 66 of the upper support guide 40 are radially aligned with the arms 74 and 76 of the lower support guide 42. In the example shown, the arms 64 and 66 extend radially outwardly a distance greater than the arms 74 and 76 extend (see FIG. 8). While the lower support guide member 42 and the lower flange 84 are shown as integral components, it will be appreciated that the lower support guide member 42 and the lower flange 84 may be separate components which are attached with any suitable fastener, for example only, a threaded bolt or rivet. An exemplary separate lower flange 84 may resemble an annular flat washer. This optional design alternative may also be incorporated with the integral upper support guide member 40 and valve retainer 54 as described above or with the embodiment shown in the Figures.

Figure 5:
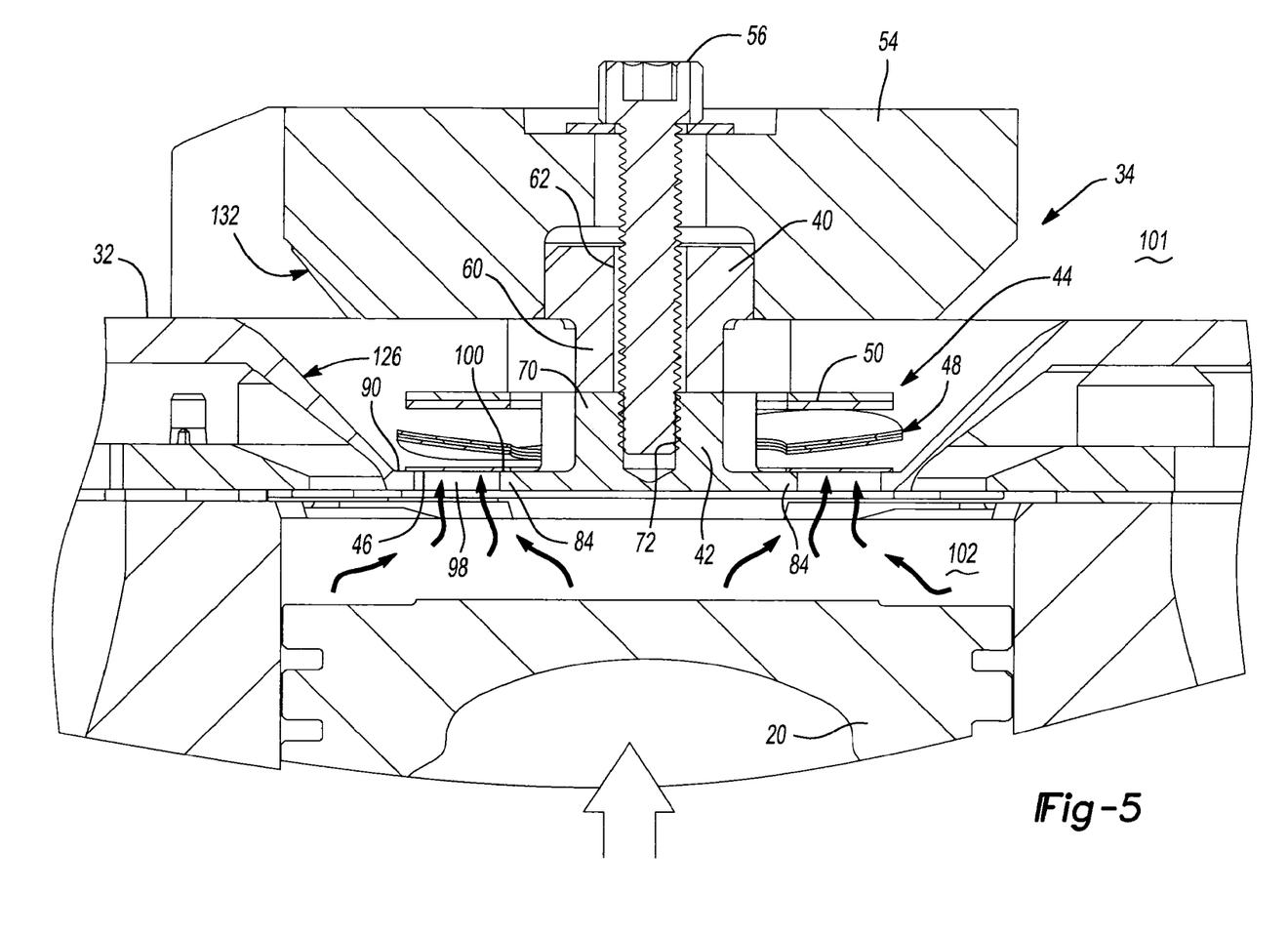
FIG. 5 is a cross-sectional view taken along lines 5-5 of FIG. 2 and shown with the reed valve assembly in a closed position.

With particular reference now to FIG. 5, the reed valve assembly 34 is shown and will be described in a closed position. In the closed position, an outboard edge of the reed 46 engages the valve plate 32 at an inner flange 90. Similarly, an inboard edge of the reed 46 engages the lower flange 84 of the lower support guide member 42. In this position, the reed 46 closes a discharge port 98 at a valve seat 100. Specifically, the valve seat 100 can be located at an area where the outer edge of the reed 46 engages the inner flange 90 of the valve plate 32 and an area that the inboard edge of the reed 46 engages the lower flange 84 of the lower support guide member 42. When the reed valve assembly 34 is in the closed position, the valve seat 100 is closed restricting or preventing the flow of gas from a discharge chamber 101 to a compression chamber 102 of the compressor body 12 associated with the piston 20. The discharge chamber 101 includes high-pressure compressed gas from the compression chamber 102.

Figure 6:
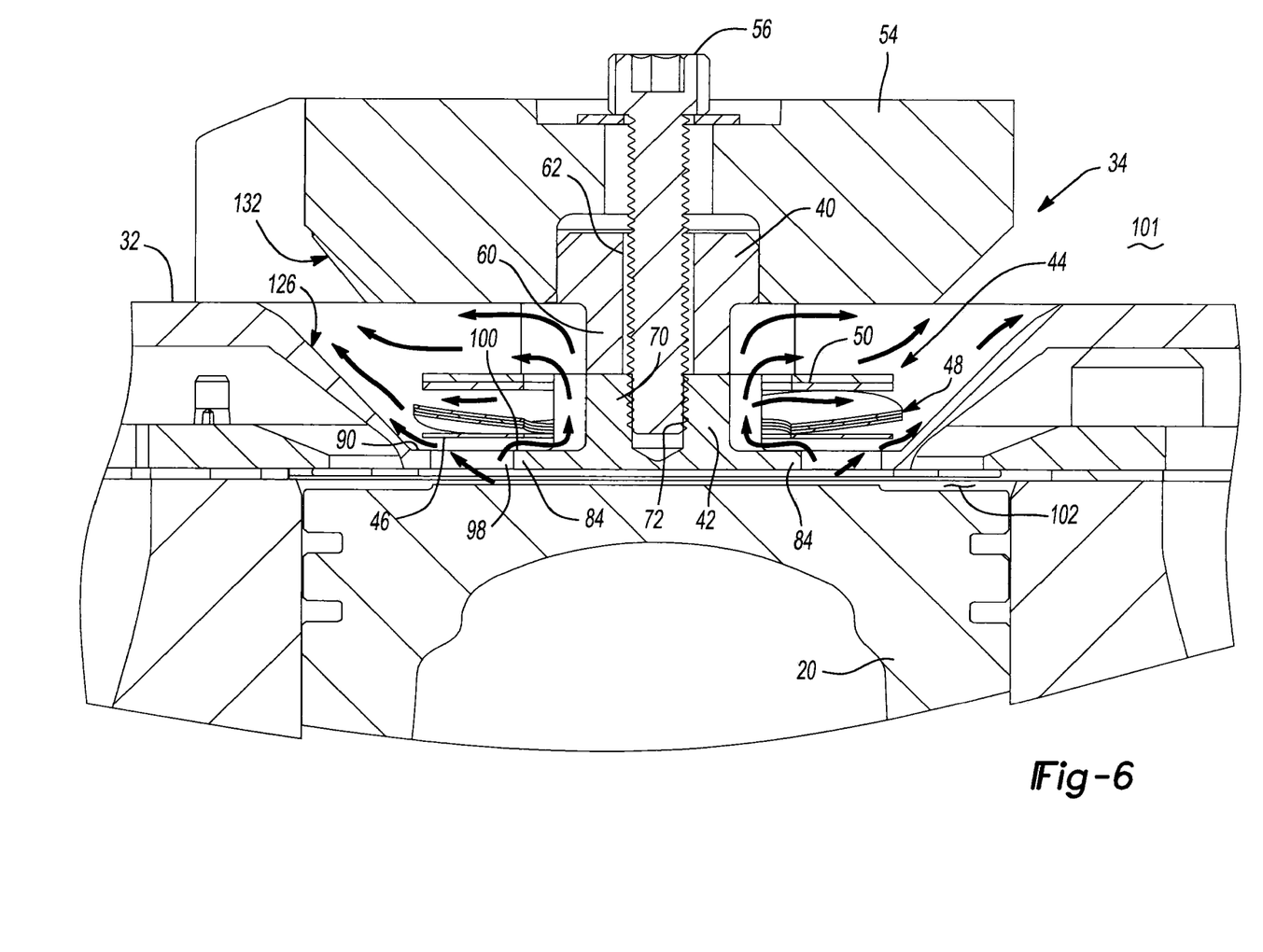
FIG. 6 is a cross-sectional view of the reed valve assembly of FIG. 5 and shown with the reed valve in an open position.
Figure 7:
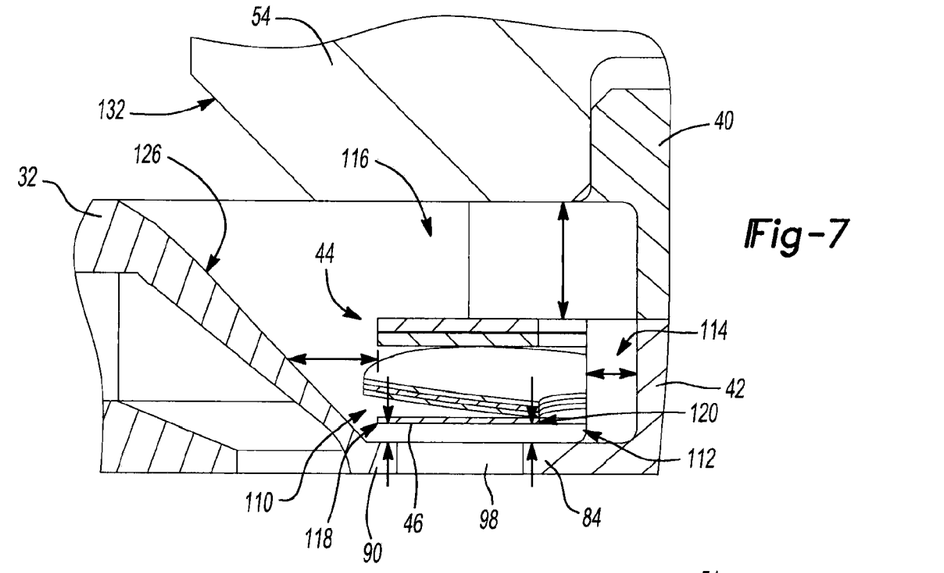
FIG. 7 is a partial schematic view of the reed valve assembly shown with the reed valve in an open position illustrating the reed valve flow area.

Turning now to FIGS. 6 and 7, the reed valve assembly 34 is shown and will be described in an open position. In the open position, the reed 46 is generally lifted away from the valve seat 100 against the bias of the spring washers 48. In the open position, the reed 46 permits gas to escape from the compression chamber 102 of the compressor body 12 to the discharge chamber 101 through an escape area defined by an outer escape area 110, an inner escape area 112, an inner channel area 114, and an upper channel area 116. In general, with the reed valve assembly 34 constructed in accordance to the present disclosure, gas is permitted to flow through the discharge port 98 both outboard of the reed 46 (outer escape area 110) and inboard of the reed 46 (through the inner escape area 112). As used herein, the term "outboard" is used to generally refer to gas that flows around an outer diameter 118 of the reed 46. The term "inboard" is used to generally refer to gas that flows around an inner diameter 120 of the reed 46. The configuration of the lower flange 84 and inner diameter 120 of the reed 46 allows the reed 46 to be constructed with a thin sidewall thickness. In this regard, the lighter the reed 46, the faster and quieter movement of the reed 46. In this way, an increased flow volume may be realized out of the discharge valve assembly 16.

The outer escape area 110 can be generally located between the outer diameter 118 of the reed 46 and the valve plate 32. More specifically, the outer escape area 110 can be located between the reed 46 and the inner flange 90 as well as generally between the reed assembly 44 and a conical inner plate flow boundary surface 126 of the valve plate 32. The inner escape area 112 can be generally located between the inner diameter 120 of the reed 46 and the lower flange 84 of the lower support guide member 42. The inner channel area 114 can be generally defined between the reed assembly 44 and the lower support guide member 42. The upper channel area 116 can be generally located between the reed assembly 44 and the upper support guide member 40 as well as between the reed assembly 44 and the valve retainer 54. The collective discharge gas can then be passed generally between the inner plate flow boundary surface 126 of the valve plate 32 and an outer plate flow boundary surface 132 provided on the valve retainer 54.

Figure 9:
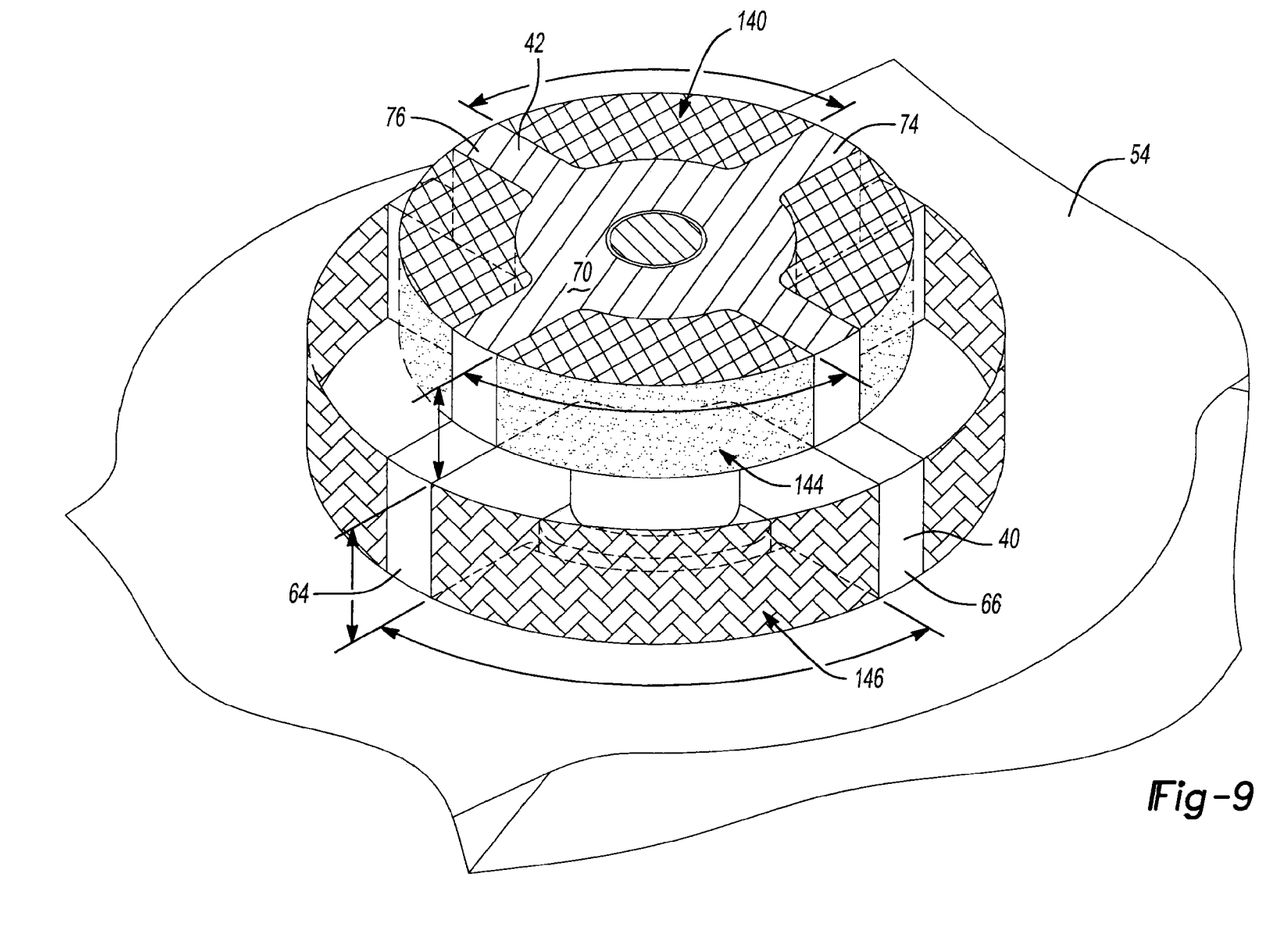
FIG. 9 is a perspective view of the upper and lower support guide members illustrating an inner channel area, an inner diameter escape area, and an upper channel area that collectively cooperate to provide a discharge flow area of the reed valve assembly.

With particular reference now to FIG. 9, additional description of the discharge flow path provided by the reed valve assembly 34 of the present disclosure will be described. In general, an inner channel area 140 can be located between adjacent arms 74 and 76 of the lower support guide member 42. An inner diameter escape area 144 can be generally located radially between adjacent arms 74 and 76 of the lower support guide member 42. An upper channel area 146 can be generally located radially between adjacent arms 64 and 66 of the upper support guide member 40. In this regard, the inner channel area, the inner diameter escape area 144, and the upper channel area 146 cooperate to provide an improved discharge flow area of the reed valve assembly 34.

It will be appreciated that while the support guide members 40 and 42 have been shown and described as "upper" and "lower" support guides, respectively, that other orientations are contemplated. Moreover, while the support guide members 40 and 42 have been described as each having four arms, other configurations having a different quantity of arms are contemplated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor comprising:
    a compressor body; and
    a discharge valve assembly coupled to the compressor body between a valve plate and a valve retainer and including at least one reed valve assembly including:
    a first support guide member;
    a second support guide member; and
    a reed assembly; said reed assembly including a reed and a spring washer disposed between the first and second support guide members and movable between a closed position wherein the reed engages the valve plate to restrict discharge gas from entering the compressor body and an open position wherein the reed is displaced from the valve plate to permit gas to escape the compressor body through an escape area defined by an outer escape area located between an outer diameter of the reed and the valve plate and an inner escape area located between an inner diameter of the reed and the second support guide,
    wherein the first support guide member includes a first central hub with a plurality of arms extending therefrom and extending a distance greater than an inner diameter of the spring washer and an inner diameter of the reed.

2. The compressor of claim 1 wherein the escape area is further defined by an upper channel area located between the reed assembly and the first support guide member.

3. The compressor of claim 2 wherein the escape area is further defined by an inner channel area located between the reed assembly and the second support guide.

4. The compressor of claim 2 wherein the reed assembly includes an upper washer that engages the first support guide in the open position.

5. The compressor of claim 4 wherein the first support guide member includes at least three first arms extending from the first central hub a distance greater than an inner diameter of the upper washer and providing an upper support for the reed assembly.

6. The compressor of claim 5, wherein the at least three first arms includes a first pair of first arms and a second pair of first arms.

7. The compressor of claim 5 wherein the second support guide member includes a second central hub and at least three second arms extending therefrom to a distance less than the inner diameter of the reed.

8. The compressor of claim 7, wherein the at least three second arms includes a first pair of second arms and a second pair of second arms.

9. The compressor of claim 1 wherein the valve plate includes a conical flow boundary surface.

10. The compressor of claim 1, wherein the second support guide member includes a flange extending radially outwardly a distance greater than the inner diameter of the reed, wherein the reed assembly engages the flange while in the closed position.

11. A compressor comprising:
a compressor body; and
a discharge valve assembly coupled to the compressor body and configured to direct discharge gas from the compressor body and between a valve plate and a valve retainer, the discharge valve assembly comprising at least one reed valve assembly comprising:
a first support guide member;
a second support guide member; and
a reed assembly including a reed and a spring washer disposed between the first and second support guide members and movable between a closed position wherein the reed engages the valve plate to restrict discharge gas from entering the compressor body and an open position wherein the reed is displaced from the valve plate and permits gas to escape the compressor body through an escape area defined by an outer escape area, an inner escape area, an upper channel area and an inner channel area, wherein the outer escape area is located between the reed and the valve plate, the inner escape area is located between the reed and the second support guide, the upper channel area is located between the reed assembly and the first support guide member and the inner channel area is located between the reed assembly and the second support guide,
wherein the first support guide member includes a first central hub with a plurality of arms extending therefrom and extending a distance greater than an inner diameter of the spring washer and an inner diameter of the reed.

12. The compressor of claim 11 wherein the reed assembly further includes an upper washer that engages the first support guide in the open position.

13. The compressor of claim 12 wherein the first support guide member includes at least three first arms extending from the first central hub a distance greater than an inner diameter of the upper washer and provide an upper support for the reed assembly.

14. The compressor of claim 13, wherein the at least three first arms includes a first pair of first arms and a second pair of first arms.

15. The compressor of claim 14 wherein the second support guide member comprises a second central hub and at least three second arms extending therefrom and extending a distance less than an inner diameter of the reed.

16. The compressor of claim 15, wherein the at least three second arms includes a first pair of second arms and a second pair of second arms.

17. The compressor of claim 16 wherein the at least three first arms are radially aligned with the at least three second arms.

18. The compressor of claim 17 wherein the at least three first arms extend radially outwardly a first distance and the at least three second arms extend radially outwardly a second distance and wherein the first distance is greater than the second distance.

19. The compressor of claim 11, further comprising a bolt centrally extending through the reed valve assembly and threadably mating with the second support guide member.

20. The compressor of claim 11, wherein the second support guide member includes a flange extending radially outwardly a distance greater than the inner diameter of the reed, wherein the reed assembly engages the flange while in the closed position.

* * * * *